United States Patent Office 3,560,102
Patented Feb. 2, 1971

3,560,102
LIQUID HERBICIDE APPLICATOR
Clifford C. Wetzel, R.F.D., Ithaca, Mich. 48849
Filed July 26, 1968, Ser. No. 748,051
Int. Cl. B43m *11/02*
U.S. Cl. 401—218                          13 Claims

ABSTRACT OF THE DISCLOSURE

A liquid herbicide applicator having a soft, rubber-like roller to which a liquid herbicide is distributed by gravity, the quantity of liquid distributed to the roller being regulated by vertical adjustment of the supply of liquid. The flow of liquid from the source to the roller is self-controlled in accordance with the position of the applicator.

---

This invention relates to apparatus for applying a liquid such as herbicide, fertilizer, insecticide, or the like to a lawn and more particularly to a soft, rubber-like roller which may be rolled across the lawn in intimate contact with the grass. If the liquid is an herbicide the liquid will be transferred directly from the roller to undesirable weeds or grasses, thereby avoiding completely any possibility that the herbicide will be blown or drifted by winds into contact with plants and shrubbery which would be affected adversely by contact with such herbicide.

The great majority of devices presently in use for controlling the growth of weeds and other undesirable grasses in lawns and the like are designed to distribute an herbicide in either finely divided solid form or in a liquid spray. In either case, the application of such an herbicide out-of-doors makes it possible for either the spray or the solid material to be wind-blown onto desirable plants and shrubbery which thereby may be killed or otherwise adversely affected. This problem has been recognized in the past and various proposals have been advanced to overcome or minimize the risk of damaging such plants and shrubbery. In none of the prior proposals, however, has it been possible to provide the desirable degree of control over the distribution of the herbicide, nor has it been possible to effect a rapid refilling of the container for the herbicide.

An object of this invention is to provide a liquid herbicide or the like applicator which overcomes the problems of the prior art devices.

Another object of the invention is to provide a liquid herbicide dispenser having a vertically adjustable reservoir or liquid source and in which the rate of flow of the liquid may be regulated by the vertical positioning of the reservoir.

A further object of the invention is to provide a liquid herbicide dispenser of the character referred to and wherein the dispensing of liquid terminates automatically whenever the apparatus is released by the operator.

A further object of the invention is to provide a liquid dispenser which enables a free and unrestricted flow of liquid along the full length of the dispenser without any interference caused by air.

Other objects and advantages of the invention will be pointed out specifically or will become apparent from the following description when it is considered in conjunction with the appended claims and the accompanying drawings, in which:

FIG. 4 is an enlarged, fragmentary sectional view of a part of the apparatus.

Figure 1:
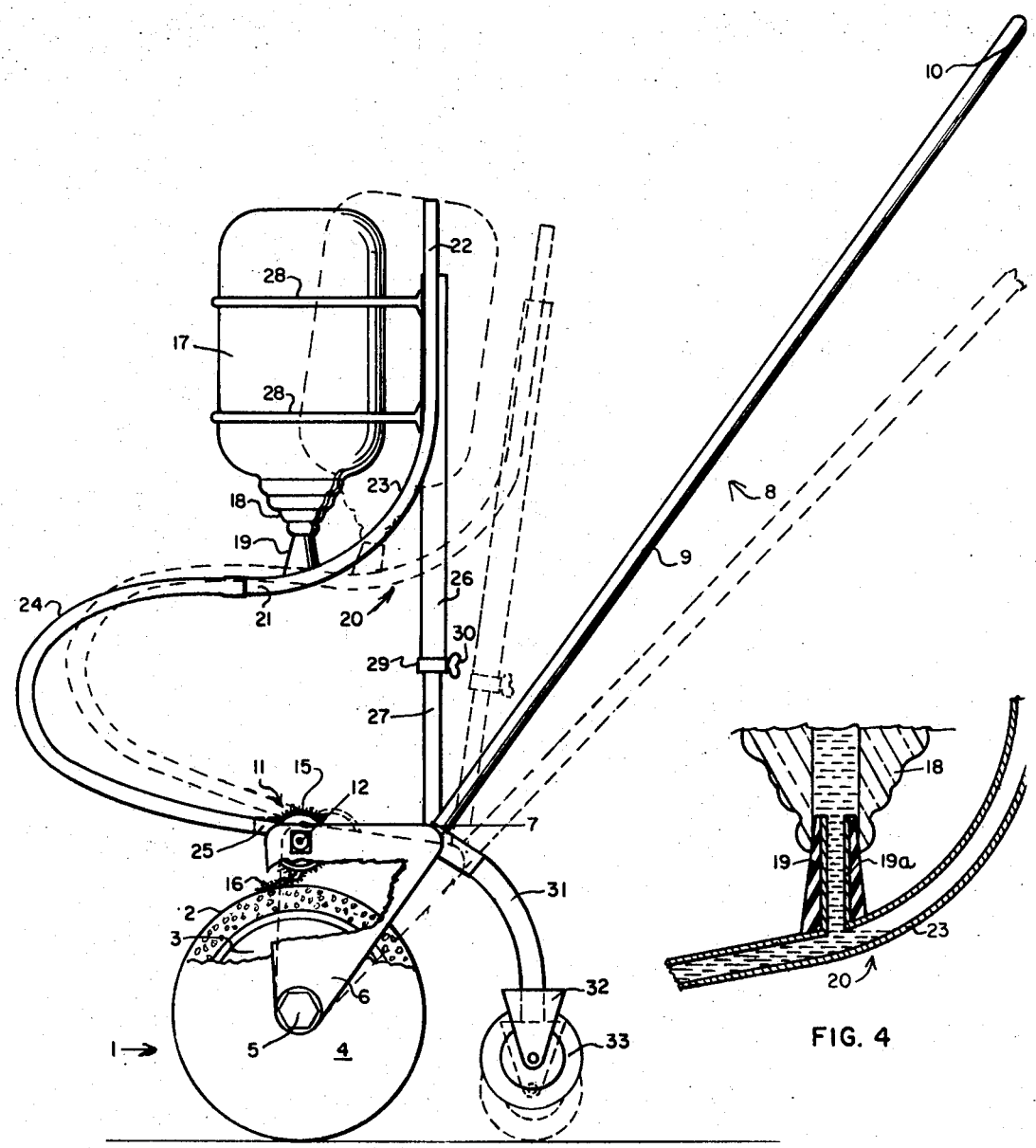
FIG. 1 is a side elevational view of the apparatus with parts broken away for purposes of illustration.
Figure 2:
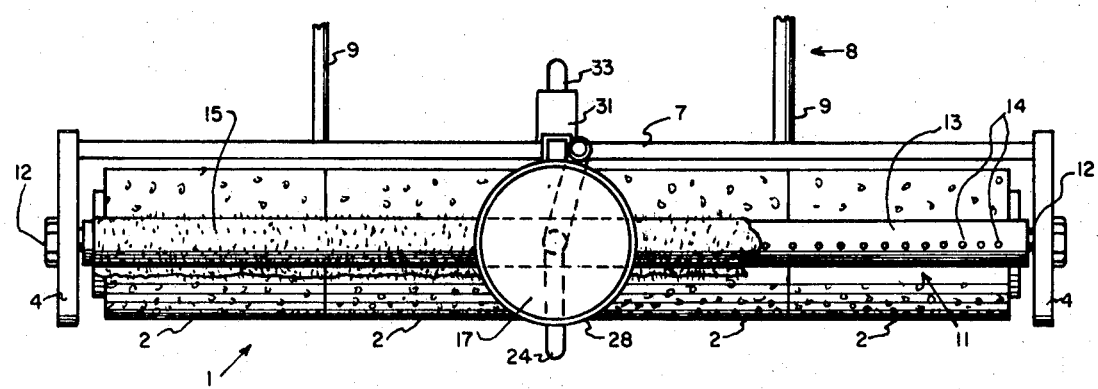
FIG. 2 is a top plan view of the apparatus.
Figure 3:
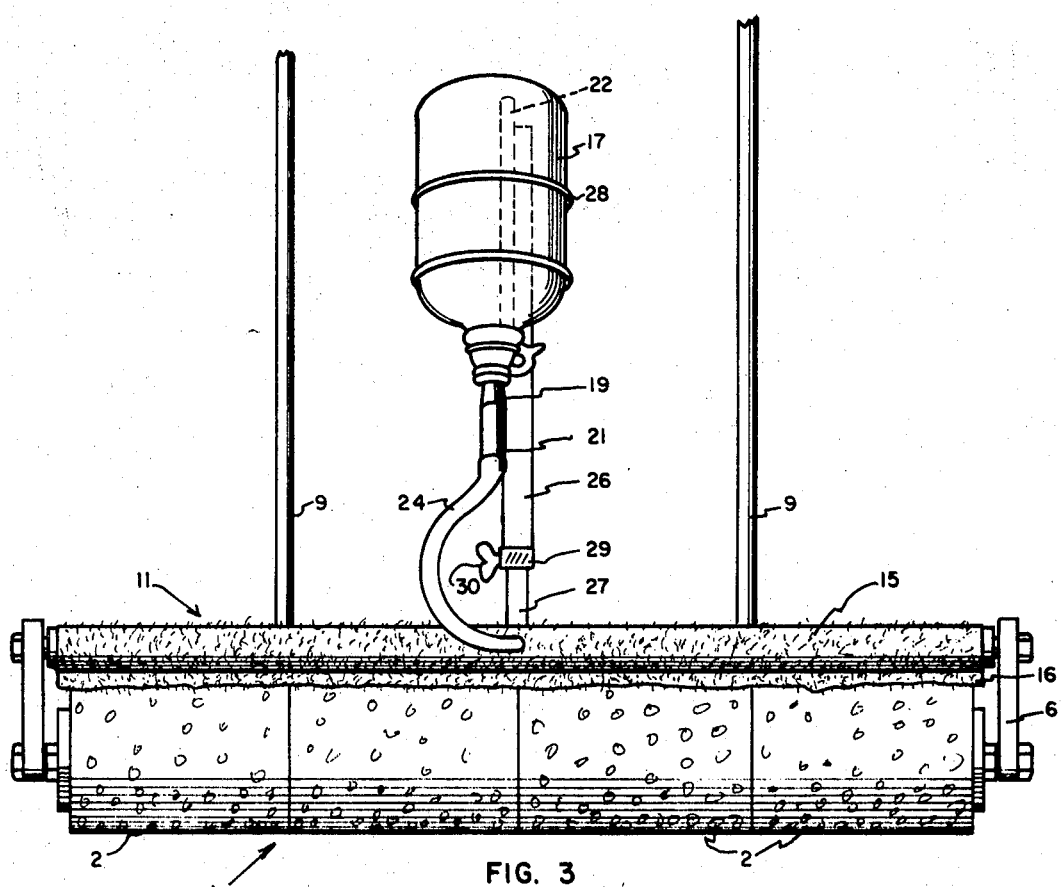
FIG. 3 is a front elevational view of the apparatus.

An applicator constructed in accordance with the invention comprises an applicator roll 1 preferably composed of a plurality of cylindrical, soft, rubber-like cylinders 2 which may be formed of polyurethane, sponge rubber, or any other similar material which is capable of absorbing liquid. Each of the cylinders 2 is threaded onto and preferably cemented to a cylindrical core 3 formed of wood, plastic, metal, or the like. At each end of the applicator roll 1 is an end disc 4 to which is fixed an axle or shaft 5 which is journaled in an adjacent support member 6 that is carried by a transverse frame member 7. Fixed to the frame member 7 is an upstanding handle 8 having a pair of parallel bars 9 joined at their upper ends by a cross bar 10. The arrangement is such that the applicator roll 1 is rotatable about the axis of the shaft 5 and may be pushed along the ground in direct contact with the grass.

A distributor 11 spans the length of the roll 1 and is fixed at its opposite ends in the supports 6 by suitable pins 12. The distributor 11 comprises a hollow pipe 13 having a series of openings 14 spaced longitudinally of the length of the pipe and so arranged as to extend vertically upwardly, i.e., away from the roll 1, for a purpose presently to be explained. Also forming part of the distributor is a sleeve 15 of the absorbent material, such as toweling or the like, and which surrounds the pipe 13. Secured to the sleeve 15 and depending from the latter is a flap 16, also of absorbent material, and which is of such length as to engage the periphery of the roll 1.

A source of liquid herbicide, fertilizer, insecticide, or the like is provided and comprises a container or jug 17 having a neck 18 through which the liquid may flow. Means for delivering liquid from the container 17 to the distributor 11 comprises a hollow rubber or the like fitting 19 which is cemented or otherwise secured to a tube 19a. One end of the fitting 19 is adapted removably to be inserted in the container neck 18 to place one end of the tube 19a in communication with the interior of the container 17. The other end of the tube is secured to a conduit 20 having two diverging branches 21 and 22 joined together by a smoothly curved intermediate portion 23. The free end of the branch 21 is accommodated in one end of a flexible tube 24, the opposite end of which accommodates a fitting 25 which communicates with the interior of the pipe 13. The free end of the conduit branch 23 is open to atmosphere. The branch 22 is secured along its length to a rectangular, hollow mounting sleeve 26 which telescopingly receives a preferably square, vertically extending mounting rod 27 which is fixed to the frame member 7. The sleeve 26 has fixed thereto a pair of forwardly projecting loops 28 in which the container 17 is accommodated.

The mounting sleeve 26 is vertically adjustable relatively to the shaft 27, and the sleeve 26 may be maintained in any selected position of adjustment by means of a clamp or stop 29 which is slidable longitudinally of the shaft 27 and which may be fixed in any selected position of adjustment by means of a setscrew 30.

Fixed to the frame member 7 and projecting rearwardly from the latter is one end of a support bar 31, the opposite end of which is fixed to a clevis 32 in which is journaled a wheel 33. The length of the bar 31 is such that, when the applicator is in its upright, operative position as is shown in full lines in FIG. 1, the wheel 33 does not engage the ground. When the wheel 33 does engage the ground, the support shaft 27 will assume an upwardly and rearwardly inclined position, as is indicated in dotted lines in FIG. 1. In this position of the support member 27, a part of the curved, intermediate conduit portion 23 will be located at a level lower than the level of the juncture of the fitting 19 with the conduit section 21. The significance of this characteristic will be pointed out hereinafter.

To condition the apparatus for operation, the container 17 will be filled to the desired level with a liquid herbicide or the like and the fitting 19 inserted in the container neck 18. The inserting of the fitting 19 into the neck of the container will be facilitated if the sleeve 26 is lifted off the shaft 27 and inverted, following which the rings 28 may be placed in surrounding relation with the container 17 while the latter is upright. Thereafter, the entire assembly may be swung to a position in which the container is inverted whereupon the sleeve 26 may be reassembled with the shaft 27.

When the apparatus is in the condition shown in FIG. 1, air may enter the container 17 via the conduit portions 22 and 23 so as to permit the contents of the container 17 to pass through the tube 19a, through the branch 21 and through the tube 24 into the pipe 13. Liquid in the pipe 13 will be discharged through the openings 14 and will be absorbed by the sleeve 15. As the sleeve becomes saturated the liquid will discharge, by gravity, onto the depending flap 16 and will be transferred to the periphery of the roll 1. Thus, as the apparatus is rolled along a lawn, the liquid will be transferred from the roll 1 to the grass, the supply of liquid to the roll constantly being replenished by engagement of the flap 16 with the roll. Inasmuch as the surface of the roll 1 is soft, it will conform substantially to the contour of the ground and will coat each leaf of a weed or the like that it contacts. Since the application of liquid to growing weeds or grasses is by contact only, there is no possibility that the liquid will be windblown.

The rate at which the liquid is dispensed from the container to the distributor 11 is proportional to the vertical distance, or height, between the tube 19a and the pipe 13. That is, the greater the height, the greater the rate of flow of liquid and, conversely, the lesser the distance the lesser the rate of flow. Thus, by vertical adjustment of the stop 29, the rate of flow of the liquid may be controlled within quite precise limits.

As has been stated earlier, the construction of the support for the wheel 33 is such that the latter does not engage the ground during rolling of the apparatus along a lawn. When the operator reaches the end of a swath, however, he may lower the handle 8 so as to engage the wheel 33 with the ground and lift the roll 1 off the ground, thereby facilitating turning of the apparatus preparatory to traversing a parallel swath. The length of the supporting arm 31 for the wheel 33 is so selected that when the wheel 33 engages ground, the conduit branch 21 is inclined rearwardly and downwardly so that the curved portion 23 of the conduit 20 is at a lower level than that of the juncture of the tube 19a with the conduit portion 21. In this position of the apparatus, liquid from the container 17 would tend to flow from the branch 21 into the curved portion 23 and thence into the branch 22. Since the branch 23 then is at a level lower than either of the branches 21 and 22, it is not possible for air to be admitted into the interior of the container 17 to enable liquid to flow from the latter. Consequently, whenever the wheel 33 engages the ground, the delivery of fluid from the container 17 terminates. Thus, the operator may leave the apparatus unattended without fear that the contents of the container will drain.

The curvature of the conduit 20 is such that liquid admitted thereto from the container 17 has a tendency to fill the conduit on both sides of the tube 19a, as is best shown in FIG. 4, as long as the apparatus is in its upright position. Further, the head caused by the elevation of the container above the distributor 11 assures flow of liquid to the distributor. As liquid drains from the conduit 20 air constantly is admitted to the container via the conduit branch 22 and the tube 19a, thereby preventing the formation of a vacuum in the container and assuring smooth flow of the liquid.

Locating the discharge openings 14 in the upper part of the pipe 13 has two important advantages. First, it prevents clogging of the openings by sediment or the like. Second, it prevents air from collecting in the pipe 13, thereby avoiding the creation of any back pressure on liquid in the pipe which could prevent equal distribution of the liquid along the full length of the pipe.

This disclosure is representative of a presently preferred embodiment of the invention but is intended to be illustrative rather than definitive thereof. The invention is defined in the claims.

I claim:

1. An applicator for a liquid comprising roller means; means mounting said roller means for rotation; means for supporting a liquid container above the level of said roller means, said container being closed except for a discharge opening at its lower end; delivery means for delivering liquid from said discharge opening by gravity to said roller means; and conduit means establishing communication between said delivery means and atmosphere at said discharge opening.

2. The construction set forth in claim 1 wherein said delivery means includes distributor means spanning the length of said roller means and being interposed between the latter and said container, said distributor means having openings therein through which said liquid may pass.

3. The construction set forth in claim 2 wherein the openings in said distributor means extend in a direction away from said roller means.

4. The construction set forth in claim 1 wherein said delivery means includes flexible, absorbent, liquid transfer means interposed between said container and said roller means.

5. The construction set forth in claim 1 wherein said delivery means includes distributor means spanning the length of said roller means and being interposed between the latter and said container, said distributor means having openings therein through which said liquid may pass; and wherein said delivery means comprises flexible, absorbent, liquid transfer means interposed between said distributor means and said roller means.

6. The construction set forth in claim 5 wherein said transfer means comprises a sleeve surrounding said distributor means and in engagement with said roller means.

7. The construction set forth in claim 1 wherein said delivery means includes a conduit open at its opposite ends and fitted intermediate its ends to said container.

8. The construction set forth in claim 7 wherein said conduit has two branches substantially normal to one another joined by a curved portion.

9. The construction set forth in claim 1 wherein said delivery means includes a conduit in communication with said container and having one end thereof open to atmosphere, said one end of said conduit being at a level above the level of communication of said conduit with said source.

10. The construction set forth in claim 1 including ground engageable means operable to locate said delivery means in such position relative to said container as to preclude delivery of liquid from said container.

11. Liquid dispensing apparatus comprising support means; means for mounting a source of liquid on said support means; conduit means having two branches substantially normal to one another and joined to each other by a curved portion; and liquid delivery means communicating between said source and said curved portion for delivering liquid from said source into said conduit, one of said branches having an open end located at a level above that of said delivery means.

12. Apparatus as set forth in claim 11 wherein the juncture of said delivery means and said curved portion is at a level above that of the end of the other of said branches.

13. An applicator for a liquid comprising roller means; means mounting said roller means for rotation; means for supporting a liquid container above the level of said roller means; distributor means spanning the length of said roller means supported at a level at which said distributor means vertically overlies said roller means below the level of said container; and means for delivering liquid from said container to said distributor means, said distributor means having openings therein for the passage of liquid, all of said openings extending substantially vertically in a direction away from said roller means.

References Cited

UNITED STATES PATENTS

| 1,091,888 | 3/1914 | Lorzing | 401—140X |
|---|---|---|---|
| 1,753,593 | 4/1930 | Bettes | 401—218 |
| 2,696,696 | 12/1954 | Tigerman | 47—1.5 |
| 3,037,235 | 6/1962 | Goggans | 401—48 |
| 3,056,997 | 10/1962 | Cummings | 401—276X |
| 3,255,929 | 6/1966 | Haan | 401—219X |

LAWRENCE CHARLES, Primary Examiner

U.S. Cl. X.R.

47—1.5